(12) United States Patent
Espedal et al.

(10) Patent No.: US 8,651,713 B2
(45) Date of Patent: Feb. 18, 2014

(54) POSITIONING REFERENCE SYSTEM FOR AN AREA FOR LANDING OF A HELICOPTER OR A LOAD SUSPENDED FROM A HELICOPTER

(76) Inventors: Torgeir Espedal, Sandnes (NO); Per Ingar Mortensen, Sandnes (NO)

( * ) Notice: Subject to any disclaimer, the term of this patent is extended or adjusted under 35 U.S.C. 154(b) by 57 days.

(21) Appl. No.: 13/515,490

(22) PCT Filed: Dec. 14, 2010

(86) PCT No.: PCT/NO2010/000456
§ 371 (c)(1),
(2), (4) Date: Jul. 11, 2012

(87) PCT Pub. No.: WO2011/074978
PCT Pub. Date: Jun. 23, 2011

(65) Prior Publication Data
US 2012/0293987 A1    Nov. 22, 2012

(30) Foreign Application Priority Data

Dec. 14, 2009  (NO) .................................. 20093516
Nov. 23, 2010  (NO) .................................. 20101648

(51) Int. Cl.
*B64D 47/02* (2006.01)
*G01B 5/00* (2006.01)

(52) U.S. Cl.
USPC ............ 362/470; 362/459; 362/460; 362/471

(58) Field of Classification Search
None
See application file for complete search history.

(56) References Cited

U.S. PATENT DOCUMENTS

| 3,866,032 A | 2/1975 | Veres |
| 7,391,340 B2* | 6/2008 | Malhomme .................. 340/947 |
| 2006/0170568 A1* | 8/2006 | Malhomme .................. 340/981 |

FOREIGN PATENT DOCUMENTS

| FR | 2 597 067 A1 | 10/1987 |
| GB | 686011 A | 1/1953 |
| JP | 62-115996 U | 7/1987 |
| SU | 901711 A2 | 1/1982 |
| WO | 98/41448 A1 | 9/1998 |

OTHER PUBLICATIONS

International Search Report for parent application PCT/N02010/000456, having a mailing date of Mar. 9, 2011.
Written Opinion for parent application PCT/N02010/000456, having a mailing date of Mar. 9, 2011.

* cited by examiner

*Primary Examiner* — Natalie Walford
(74) *Attorney, Agent, or Firm* — Andrus Intellectual Property Law, LLP

(57) ABSTRACT

A system is for a landing site for a helicopter or a load suspended from a helicopter, where landing positioning references are visualized as a luminous pattern on the landing site, and where the landing positioning references are formed as lines of light projected on the landing site from one or more light sources arranged at the landing site. A method is for forming of landing positioning references visualized as a luminous pattern on the landing site.

13 Claims, 3 Drawing Sheets

POSITIONING REFERENCE SYSTEM FOR AN AREA FOR LANDING OF A HELICOPTER OR A LOAD SUSPENDED FROM A HELICOPTER

CROSS-REFERENCE TO RELATED APPLICATIONS

This application is the U.S. national stage application of International Application No. PCT/NO2010/000456, filed Dec. 14, 2010, which International application was published on Jun. 23, 2011 as International Publication No. WO 2011/074978 A1 in the English language and which application is incorporated herein by reference. The International application claims priority of Norwegian Patent Application No. 20093516, filed Dec. 14, 2009, and Norwegian Patent Application No. 20101648, filed Nov. 23, 2010, which applications are incorporated herein by reference.

BACKGROUND

There is described a system for a landing site for a helicopter or a load suspended from a helicopter, where the landing positioning references are visualized as a luminous pattern on the landing site. There is also described a method for forming the landing positioning references.

A landing site for a helicopter, such as a helicopter landing deck on a ship or an offshore oil or gas field installation, comprises use of symbols defined in national or international regulations, such as "Bestemmelser for Sivil Luftfart" (BSL—Regulations regarding Civil Aviation) showing the use of a yellow reference circle on the landing site and also a white "H" centred in the circle. The sizes of the symbols are decided by dimensioning helicopter size for the relevant landing site, obstacles in the surroundings etc. For aid during landing and take-off in darkness green edge lights mark the boundaries of the landing site. Landing in the dark and/or bad weather often create problems for the helicopter crew with regards to the positioning of the helicopter relative to the landing site centre and in evaluating the extent of the landing site, particularly when the landing site is a deck positioned in the bow portion of a vessel, the vessel lying bow to the wind, the preferred motion direction of the helicopter is having the front against the wind, and the optimal landing direction is parallel to the longitudinal direction of the vessel.

Another problem during a landing operation in the dark is the indication of wind direction and strength. The indication is today made by a so-called windsock, but this may be difficult to see due to structures projecting upwards in the area near the landing site.

A corresponding problem occurs during landing of a load suspended from a hovering helicopter, whether it be personnel, for example by landing of service personnel on wind mills at sea in the dark, or materials, such as structures to be positioned exactly on a foundation during bad weather conditions.

Even if in the further description essentially current problems and solutions tied to landing of a helicopter on a permanent landing site are discussed, the solutions may also be employed for a temporary landing site, such as a landing site for an ambulance helicopter at a parking lot for an ambulance vehicle, and also for marking of a landing area for a load suspended from a helicopter.

Experimental trials and test installations of helicopter decks with flush mounted light panels in the deck to elucidate the landing circle and the H-symbol have been undertaken. This has not brought about changes in the forming of the references on the deck, and the issue regarding evaluation of length, width and course directional references relative to the landing site are as relevant as before.

WO 98/41448 describes an apparatus arranged to assist a helicopter during landing. The apparatus comprises a package containing a packaged helicopter landing fabric which, when it is spread out on a substratum, may show the helicopter pilot where to land. The fabric comprises a flexible strip of electro luminescent material becoming luminous as a result of being supplied with electrical power from an energy source to thereby enable the helicopter pilot to see the helicopter landing fabric during landing conditions with bad visibility.

GB 686011 describes a landing site for helicopters where is formed a landing pattern for aid in the dark. The pattern is formed by one or more solid-drawn or dotted lines lying in the horizontal plane and forming a circular ring having a diameter of 100 feet (approx. 30 m) or more, with or without a second circular ring and one or more radial, straight lines. The wind direction may be indicated by providing a gap in the circle according to the registered wind direction, either by a central floodlight and a wind vane creating a shadow on the circle or by a wind vane controlled breaker system turning off the light elements in a part of the circle.

The object of the invention is to remedy or reduce at least one of the disadvantages of the prior art, or at least providing a useful alternative to the prior art.

The object is achieved by the features disclosed in the below description and in the subsequent claims.

The invention provides a system of several light projecting devices together drawing lines on a landing site, such as a landing platform, as the lines form a suitable pattern indicating a preferred landing direction and the centre of the landing site. In one embodiment the pattern is cruciform where the longitudinal axis indicates the recommended approach direction, and the lateral axis marking line, perpendicular to the longitudinal axis, lies close to a periphery of a per se known marking circle preferably to windward, i.e. upwind of relative wind direction. The lateral line will thus form a reference line useful for positioning the helicopter in the longitudinal direction during the latter part of the approach to the landing site.

The system comprises a set of light sources where a selection of light sources or all in unison form the desired pattern of lighted lines on the landing site.

In one embodiment the light sources form a line of light, for example like a line laser. To be able to provide a light pattern adapted to such as the relevant wind direction, a set of at least two light sources, at least one light source forming the longitudinal line of light and at least one light source forming the transverse line of light, be arranged relocatably along the periphery of the landing site, such as along a circular path having its centre coincident with the centre of the landing site. Alternatively the system may comprise several light sources distributed around the landing site in such a manner that whatever the wind direction and landing site orientation there is a combination of light sources which together may form a pattern of light lines indicating a favourable approach marking.

In another embodiment the light source is provided with three axes of rotation, as the lens of the light source may be rotated about its central axis, about a vertical axis and also about a horizontal axis being perpendicular to the vertical axis and the lens centre axis. By controlled rotation of the line light source about the three axes a line of light will be able to be positioned according to the need. More line light sources may be synchronised such that a complete pattern is formed in the desired position and direction.

In a further embodiment one or more point light sources are employed, which by rapid flashing and controlled rotation about two axes, such as a horizontal axis and a vertical axis, are arranged to be able to "draw" lines on the landing site. In one version one point light source may draw several lines together forming a pattern, or the system may comprise several point light sources individually "drawing" a whole or a part of a line, as all the point light sources by synchronised control provides the desired pattern of light lines.

If the helicopter is shadowing for the light sources in a critical phase of the approach, the effect of this may be eliminated by light being sent out from opposing sides of the landing site.

Advantageously the light sources are provided with screening or a control system preventing radiation of light in an area that may bother the helicopter crew during manoeuvring in toward the landing site in that light falls directly in toward the helicopter flight deck.

The invention may comprise one or more indicators arranged on a helicopter, where incident light from said light sources generates a signal. The helicopter crew may thereby get an indication that a correct position relative to the lateral line is reached without there being a need for direct view of the illuminated portion of the landing site.

By use of the invention good references for accurate manoeuvring of a helicopter during landing and take-off will be achieved. This will increase the margins of safety for operation of helicopters on oil platforms and vessels considerably, especially during conditions of darkness.

In a first aspect the invention relates more specifically to a system for a landing site for a helicopter or a load suspended from a helicopter, where the landing positioning references are visualised as a luminous pattern on the landing site, characterised in that the landing positioning references are formed as lines of light projected on the landing site from one or more light sources arranged at the landing site.

The at least one light source may constitute one or more light source sets together forming a light source system encircling the landing site.

The at least one light source may be a source of light lines.

The source of light lines may comprise an optical system that may be manipulated by means of an actuator system connected to a light source control unit and is arranged to be able to orientate a portion of a collection of light beams toward any area of the landing site and to orientate a projected light line segment in a desired, horizontal direction on the landing site.

The light lines source may comprise an optical system provided with several light line generating means where each, independent of each other, are arranged to be able to orientate a projected light line segment in a desired, horizontal direction on the landing site to thereby be able to project intersecting light lines.

Alternatively the at least one light source may be a point light source.

The point light source may comprise an optical system that may be manipulated by means of an actuator system connected to a light source control unit and is arranged to be able to orientate a light beam bundle toward any area of the landing site and to project a light point on the landing site.

In a second aspect the invention relates more specifically to a method for forming landing positioning references visualised as a luminous pattern on a landing site for a helicopter or a load suspended from a helicopter, characterised in that the method comprises the following step:

to project light on the landing site from one or more light sources arranged at the landing site.

The method may further comprise:
to form the luminous pattern by cooperation of at least two line light sources which independent of each other are arranged to be able to project a light line.

The method may further comprise:
to form the luminous pattern of several light line segments by pulsing a light line source coordinated with a projection of a light line segment in alternating position and direction.

The method may further comprise:
to manipulate by means of an actuator system connected to a light source control unit an optical system connected to the line light source to thereby direct a portion of a light beam collection toward any area of the landing site and to orientate a projected light line segment in a desired horizontal direction on the landing site.

The method may further comprise:
to form the luminous pattern of several light points by pulsing a point light source coordinated with a projection of a light point in an alternating position.

The method may further comprise:
to manipulate by means of an actuator system connected to a light source control unit an optical system connected to the point light source to thereby direct a light beam bundle toward any area of the landing site.

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
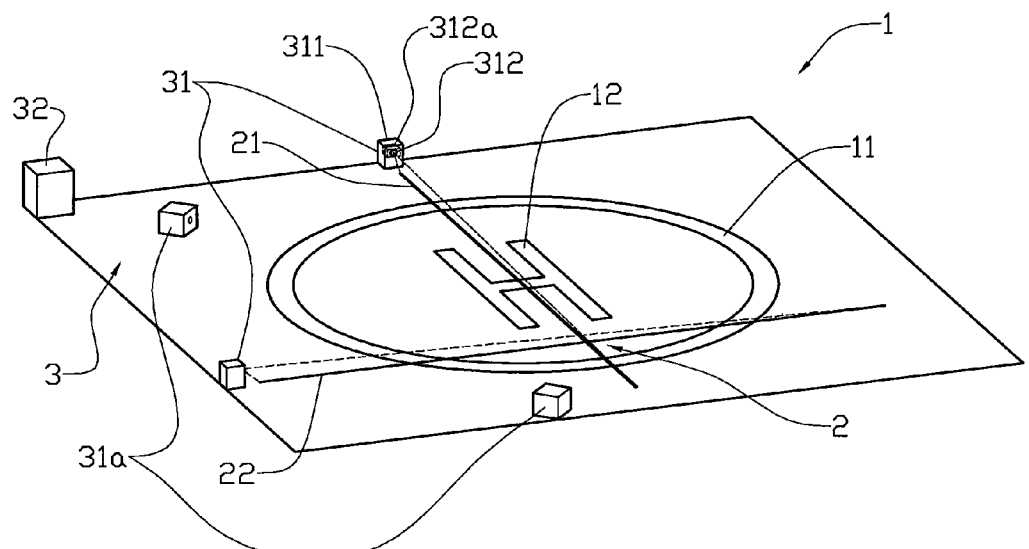
FIG. 1 shows in perspective a landing site for a helicopter provided with a light source system according to the invention where a pattern of light lines is projected on the landing site by means of a set of light sources comprising two line light sources.

In the figures the reference numeral 1 indicates a landing site. A permanent landing site for helicopters will according to regulations be provided with several marking symbols, shown here as a first marking symbol 11 shaped like a circle, and a second marking symbol 12 shaped like an H.

Figure 2:
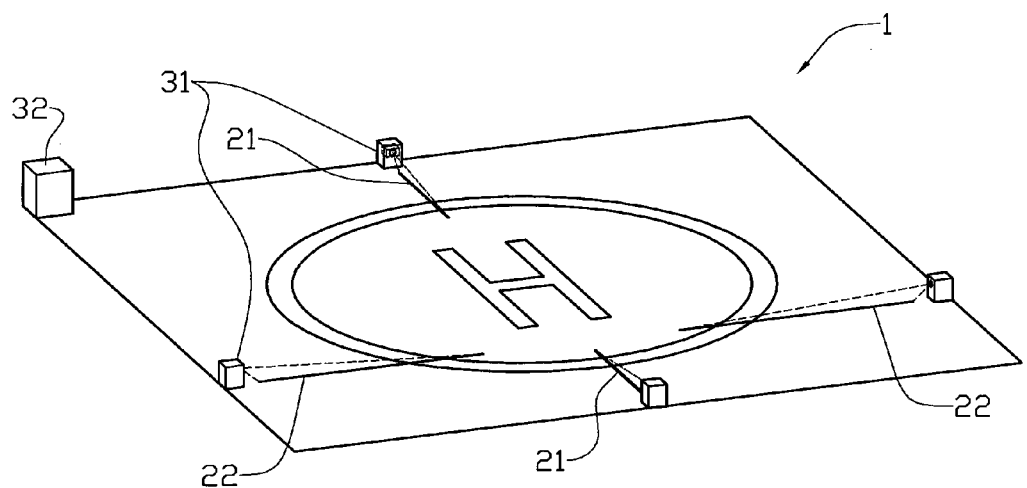
FIG. 2 shows in perspective a landing site for a helicopter provided with a light source system according to the invention where a pattern of light lines is projected on the landing site by means of a set of light sources comprising four line light sources and each light source light line projection is defined.

In the FIGS. 1 and 2 is shown a light pattern 2, shown here as a landing cross, formed by several lines, shown here as a first and a second line 21, 22 respectively as a longitudinal axis marking and a lateral axis marking in an assembled landing positioning reference.

Figure 3A:
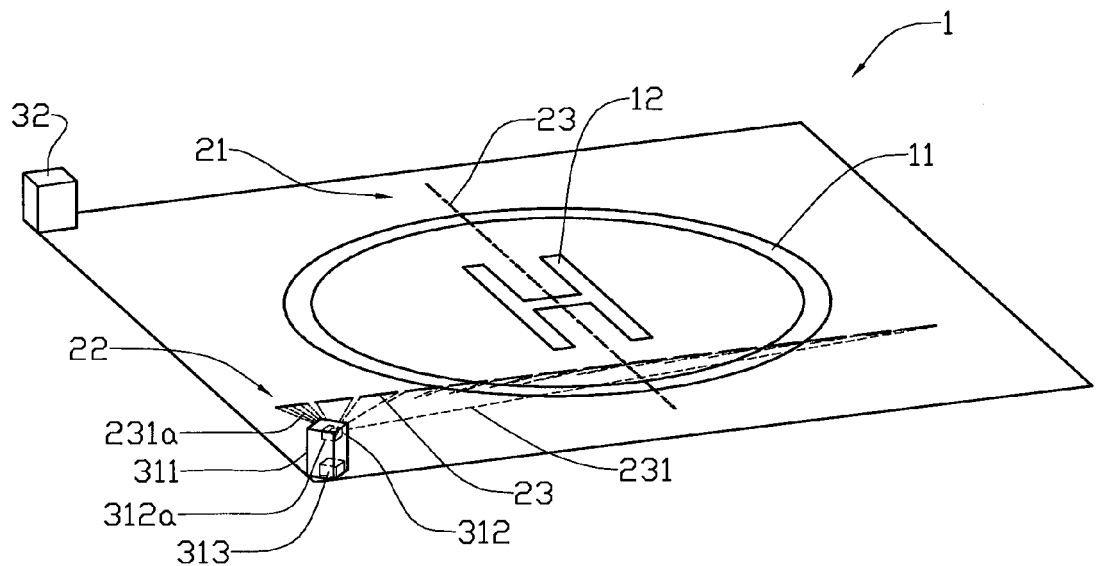
FIGS. 3a and 3b shows in perspective a landing site for a helicopter provided with a light source system according to the invention where a pattern of light lines is projected on the landing site by means of a set of light sources comprising one line light source; as FIG. 3a indicates the projection of a first line, and FIG. 3b indicates the projection of a second line.
Figure 3B:
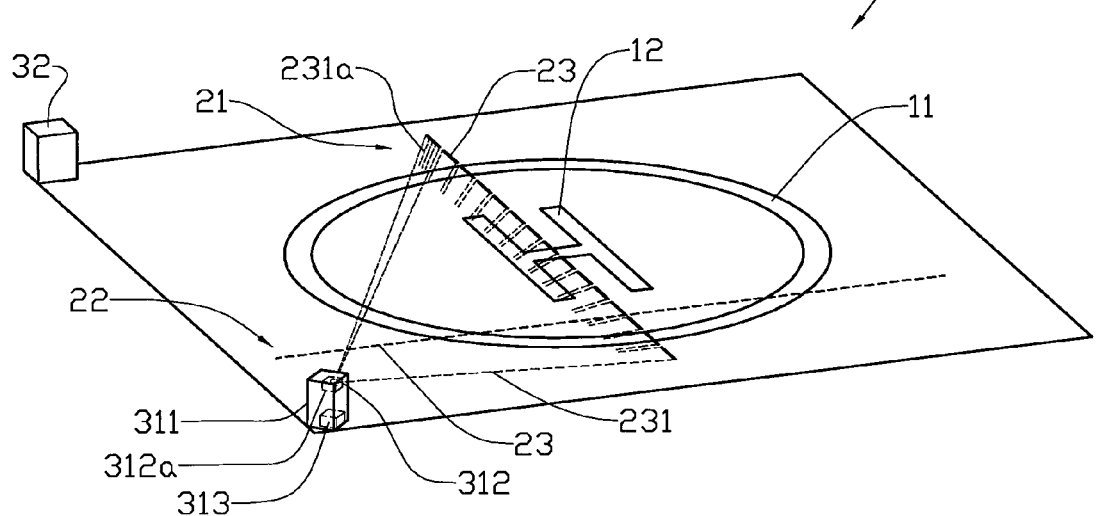

In the FIGS. 3a and 3b the lines 21, 22 are formed by several light line segments 23 as a light beam collection 231 comprises several distinct portions 231a each forming a light line segment 23.

Figure 4:
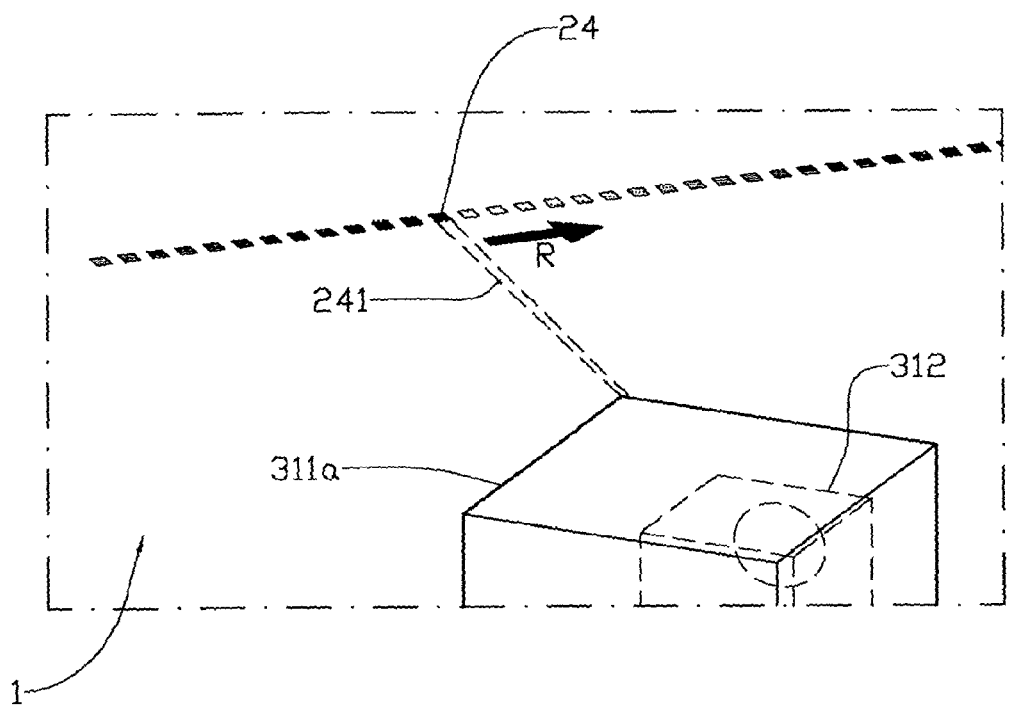
FIG. 4 shows in perspective and to a larger scale a section of a landing site provided with a light source system according to the invention where a pattern of light lines is projected on the landing site by means of a set of light sources comprising one point light source.

In FIG. 4 the line 22 is formed by several points of light 24, indicated here by the points of light 24 being marked off in turn in the direction R at so high frequency and so small intervals that the human eye perceives the collection of marked off light points as a continuous line 22. In FIG. 4 varying density in the hachure indicates the gradual weakening of the light intensity in the light points 24. Also broken line patterns (not shown) may be formed in this manner.

A light source system 3 comprises one or more light source sets, shown in FIG. 1 with a first and a second light source sets 31, 31a, and in the remaining figures with only one light source set 31. The light source set 31, 31a comprises in a first embodiment (see FIG. 1) two light sources 311 in the form of line light sources, in a second embodiment (see FIG. 2) four line light sources 311, and in a further embodiment (see FIGS. 3a and 3b) one line light source 311, and in yet another embodiment (see FIG. 4) one point light source 311a.

The line light source 311 comprises an optical system 312 with means 312a in its first embodiment arranged to project a continuous, luminous line 21, 22. In a further embodiment, like the system is shown in the FIGS. 3a and 3b, the line generating means 312a is arranged to project a line segment 23 which by means of an integrated actuator system 313 may orientate the line generating means 312a such that the projected line 21, 22 or the line segment 23 takes up a prescribed direction and position on the landing site 1. By projecting several line segments 23 one after another with pulsating light with intervening change of projecting position at sufficiently high frequency, the impression is created of a continuous light line pattern 2 with the prescribed form and extent, in the same manner as described above for lines formed by means of the point light source 311a.

The light sources 311, 311a are connected to a light source control unit 32. The light source control unit 32 may comprise not shown means for collection of data concerning wind direction, restrictions in the surrounding air space etc. to thereby be able to generate a light line pattern 2 giving relevant information to a helicopter pilot about approach direction and positioning of the helicopter on the landing site 1.

The invention claimed is:

1. A system for a landing site for a helicopter or a load suspended from a helicopter, the system comprising landing positioning references that are visualised as a luminous pattern on the landing site, wherein the landing positioning references are formed as lines of light projected on to the landing site from at least one light source arranged at the landing site.

2. A device according to claim 1, wherein the at least one light source constitutes one of several light source sets which together form a light source system encircling the landing site.

3. A device according to claim 1, wherein the at least one light source is a line light source.

4. A device according to claim 3, wherein the line light source comprises an optical system that may be manipulated by an actuator system connected to a light source control unit and is arranged to be able to direct a portion of a light beam collection toward any area of the landing site and to orientate a projected light line segment in a desired horizontal direction on the landing site.

5. A device according to claim 3, wherein the line light source comprises an optical system provided with several light line generating means that each, independently of each other, are arranged to be able to orientate a projected light line segment in a desired, horizontal direction on the landing site to thereby be able to project intersecting light lines.

6. A device according to claim 1, wherein the at least one light source is a point light source.

7. A device according to claim 3, wherein the point light source comprises an optical system that may be manipulated by means of an actuator system connected to a light source control unit and is arranged to be able to direct a light beam bundle toward any area of the landing site and to orientate a projected light point on the landing site.

8. A method for forming of landing positioning references visualised as a luminous pattern on a landing site for a helicopter or a load suspended from a helicopter, the method comprising:
projecting light on the landing site from one or more light sources arranged at the landing site.

9. A method according to claim 8, wherein the method further comprises:
forming the luminous pattern by cooperation of at least two line light sources that independently of each other are arranged to be able to project a light line.

10. A method according to claim 8, wherein the method further comprises:
forming the luminous pattern by more light line segments by pulsing a line light source coordinated with a projecting of a light line segment in alternating position and direction.

11. A method according to claim 10, wherein the method further comprises:
by means of an actuator system connected to a light source control unit to manipulate an optical system connected to the line light source to thereby direct a portion of a light beam collection toward any area of the landing site and to orientate a projected light line segment in a desired, horizontal direction on the landing site.

12. A method according to claim 8, wherein the method further comprises:
forming the luminous pattern by several light points by pulsing of a point light source coordinated with a projection of a light point in an alternating position.

13. A method according to claim 10, wherein the method further comprises:
operating an actuator system connected to a light source control unit to manipulate an optical system connected to the point light source to thereby direct a light beam bundle toward any area of the landing site.

* * * * *